United States Patent
Jang et al.

(10) Patent No.: US 9,899,642 B2
(45) Date of Patent: Feb. 20, 2018

(54) RECHARGEABLE BATTERY AND MODULE THEREOF

(71) Applicant: SAMSUNG SDI CO., LTD., Yongin-si, Gyeonggi-do (KR)

(72) Inventors: Myung-Jae Jang, Yongin-si (KR); Sang-Won Byun, Yongin-si (KR); Chi-Young Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 221 days.

(21) Appl. No.: 14/834,348

(22) Filed: Aug. 24, 2015

(65) Prior Publication Data

US 2016/0248055 A1    Aug. 25, 2016

(30) Foreign Application Priority Data

Feb. 24, 2015  (KR) .................. 10-2015-0026027

(51) Int. Cl.
| | | |
|---|---|---|
| *H01M 10/50* | (2006.01) | |
| *H01M 2/06* | (2006.01) | |
| *H01M 2/30* | (2006.01) | |
| *H01M 2/02* | (2006.01) | |

(52) U.S. Cl.
CPC ............... *H01M 2/06* (2013.01); *H01M 2/30* (2013.01); *H01M 2/0217* (2013.01)

(58) Field of Classification Search
CPC ......... H01M 2/06; H01M 2/30; H01M 2/0217
See application file for complete search history.

(56) References Cited

U.S. PATENT DOCUMENTS

| | | |
|---|---|---|
| 8,815,440 B2 | 8/2014 | Kameda et al. |
| 2010/0047686 A1 | 2/2010 | Tsuchiya et al. |
| 2013/0078506 A1 | 3/2013 | Guen |
| 2014/0193678 A1 | 7/2014 | Kim |

FOREIGN PATENT DOCUMENTS

| | | |
|---|---|---|
| EP | 2154738 A1 | 2/2010 |
| EP | 2472643 A1 | 7/2012 |
| EP | 2790250 A2 | 10/2014 |
| EP | 2806477 A1 | 11/2014 |
| JP | 2012-84311 A | 4/2012 |
| JP | 5378134 B2 | 12/2013 |
| JP | 2014-135204 A | 7/2014 |
| KR | 10-2013-0048567 A | 5/2013 |

OTHER PUBLICATIONS

English machine translation of Japanese Publication No. JP 2012-84311 A, dated Apr. 26, 2012, 11 pages.
English machine translation of Japanese Publication No. JP 2011-076731, dated Apr. 14, 2011, for JP 5378134 B2, 7 pages.
English machine translation of Japanese Publication No. JP 2014-135204 A, dated Jul. 24, 2014, 15 pages.
EPO Extended Search Report dated Jun. 16, 2016, for corresponding European Patent Application No. 16152881.5 (8 pages).

*Primary Examiner* — Jane Rhee
(74) *Attorney, Agent, or Firm* — Lewis Roca Rothgerber Christie LLP

(57) ABSTRACT

A rechargeable battery includes an electrode assembly; a case housing the electrode assembly; a cap plate sealing an opening of the case; an electrode terminal that is electrically connected to the electrode assembly and extends through a terminal hole of the cap plate and is oriented outside of the cap plate; and an insulating member that electrically insulates the cap plate and the electrode terminal while supporting the electrode terminal at an outer surface of the cap plate.

12 Claims, 7 Drawing Sheets

RECHARGEABLE BATTERY AND MODULE THEREOF

CROSS-REFERENCE TO RELATED APPLICATION

This application claims priority to and the benefit of Korean Patent Application No. 10-2015-0026027 filed in the Korean Intellectual Property Office on Feb. 24, 2015, the entire contents of which are incorporated herein by reference.

BACKGROUND

1. Field

The present invention relates to a rechargeable battery and a rechargeable battery module including the rechargeable battery.

2. Description of the Related Art

A rechargeable battery can repeatedly perform charge and discharge, unlike a primary battery. A rechargeable battery of a small capacity is used for a small portable electronic device like a mobile phone or a laptop computer and a camcorder, and a rechargeable battery of a large capacity is used as a power source for driving a motor of a hybrid vehicle and an electric vehicle.

A rechargeable battery may be used as a single battery cell, as in for a small electronic device, or may be used in a module state in which a plurality of battery cells are electrically connected, as when used for driving a motor. A rechargeable battery module is typically formed by connecting electrode terminals of unit battery cells with a busbar.

The rechargeable battery has a negative electrode terminal that is connected to a negative electrode of the electrode assembly and a positive electrode terminal that is connected to a positive electrode thereof. When forming a rechargeable battery module, negative and positive electrode terminals of adjacent rechargeable batteries are connected with a busbar.

In this case, an insulating member that supports negative and positive electrode terminals at an outer surface of a cap plate may be melted or may generate smoke due to a welding heat occurring upon laser welding. Therefore, strength deterioration and an external appearance failure of an insulating member may occur.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a rechargeable battery being able stably support an electrode terminal that is installed in a cap plate with an insulating member. Further, embodiments of the present invention provide a rechargeable battery module being able to prevent or reduce the likelihood that an insulating member will melt when welding a busbar to an electrode terminal of unit battery cells.

An exemplary embodiment of the present invention provides a rechargeable battery including: an electrode assembly that charges and discharges a current; a case that houses the electrode assembly; a cap plate that closes and seals an opening of the case; an electrode terminal that is electrically connected to the electrode assembly and that is drawn out to a terminal hole of the cap plate to be disposed outside of the cap plate; and an insulating member that electrically insulates the cap plate and the electrode terminal while partially supporting the electrode terminal at an outer surface of the cap plate.

The insulating member may be insert injection molded to be integrally provided between the electrode terminal and an outer surface of the cap plate, between the electrode terminal and the terminal hole, and between the electrode terminal and an inner surface of the cap plate.

The electrode terminal may include: a current collecting portion that is connected to the electrode assembly; a pillar portion that is connected to the current collecting portion to be located at the terminal hole; and a plane portion that is connected to the pillar portion to be extended in a direction receding from the terminal hole.

The plane portion may face and be separated from an outer surface of the cap plate at both sides of a width direction of the cap plate.

The insulating member may include: a first insulating portion that encloses the pillar portion at a periphery of the terminal hole and that supports one side of the plane portion; and a second insulating portion that is located at a separated location in a length direction of the cap plate in the first insulating portion to support another side of the plane portion, wherein at both sides of a width direction of the cap plate, a heat avoidance space that avoids welding heat occurring when welding a busbar to the plane portion may be set.

The insulating member may further include a third insulating portion that is oriented in a length direction of the cap plate to connect the first insulating portion and the second insulating portion and that supports the plane portion.

The heat avoidance space may be set at both sides of the width direction of the third insulating portion.

In the width direction, the first insulating portion may be formed in a first width at the adjacent side of the cap plate and may be formed in a second width that is larger than the first width at the adjacent side of the plane portion.

In the width direction, the second insulating portion may be formed with the same width as the first width.

In the width direction, the plane portion may be formed in the second width to be supported in the second width in the first insulating portion and be supported in the first width in the second insulating portion to not have support at an outer edge of the second insulating portion.

The insulating member may include: a first insulating portion that encloses the pillar portion at a periphery of the terminal hole and that supports one side of the plane portion; a second insulating portion that is located at a separated location in a length direction of the cap plate in the first insulating portion to support another side of the plane portion; and a bottom portion that connects the first insulating portion and the second insulating portion at an outer surface of the cap plate, wherein the plane portion may face and be separated from the bottom portion of the insulating member at both sides of a width direction of the cap plate.

The insulating member may set a heat avoidance space that avoids welding heat occurring when welding a busbar to the plane portion on the bottom portion at both sides of a width direction of the cap plate.

The insulating member may further include a third insulating portion that is oriented in a length direction of the cap plate on the bottom portion to connect the first insulating portion and the second insulating portion and that supports the plane portion.

The insulating member may further include a fourth insulating portion that is oriented in the width direction between the first insulating portion and the second insulating portion on the bottom portion to support the plane portion.

The heat avoidance space may be set at both sides of the width direction of the third insulating portion and may be partitioned by the fourth insulating portion in the length direction.

In the width direction, the first insulating portion may be formed with a first width at the adjacent side of the cap plate and may be formed with a second width that is larger than the first width at the adjacent side of the plane portion.

In the width direction, the second insulating portion and the fourth insulating portion may be formed with the same width as the first width.

In the width direction, the plane portion may be formed with a second width to be supported in a second width in the first insulating portion and be supported with a first width in the second insulating portion and the fourth insulating portion to not have support at an outer edge of the second insulating portion.

Another embodiment of the present invention provides a rechargeable battery module including: a plurality of unit battery cells that insulate a negative electrode terminal and a positive electrode terminal made of different metals by partially supporting with an insulating member at an outer surface of a cap plate; and a busbar that is made of a clad metal having a negative electrode portion and a positive electrode portion made of the same material as that of the negative electrode terminal and the positive electrode terminal to be connected by welding to the negative electrode terminal and the positive electrode terminal of adjacent unit battery cells, wherein the insulating member sets a heat avoidance space that avoids welding heat occurring when welding the busbar to the negative electrode terminal and the positive electrode terminal at both sides of a width direction of the cap plate.

The negative electrode terminal and the negative electrode portion may be made of copper to be connected, and the positive electrode terminal and the positive electrode portion may be made of aluminum to be connected.

According to an exemplary embodiment of the present invention, at an outer surface of a cap plate, when welding a busbar to an electrode terminal of a unit battery cell, an insulating member supporting the electrode terminal can prevent battery components from melting, even if subjected to welding heat. Therefore the insulating member can stably support the electrode terminal with respect to the cap plate.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
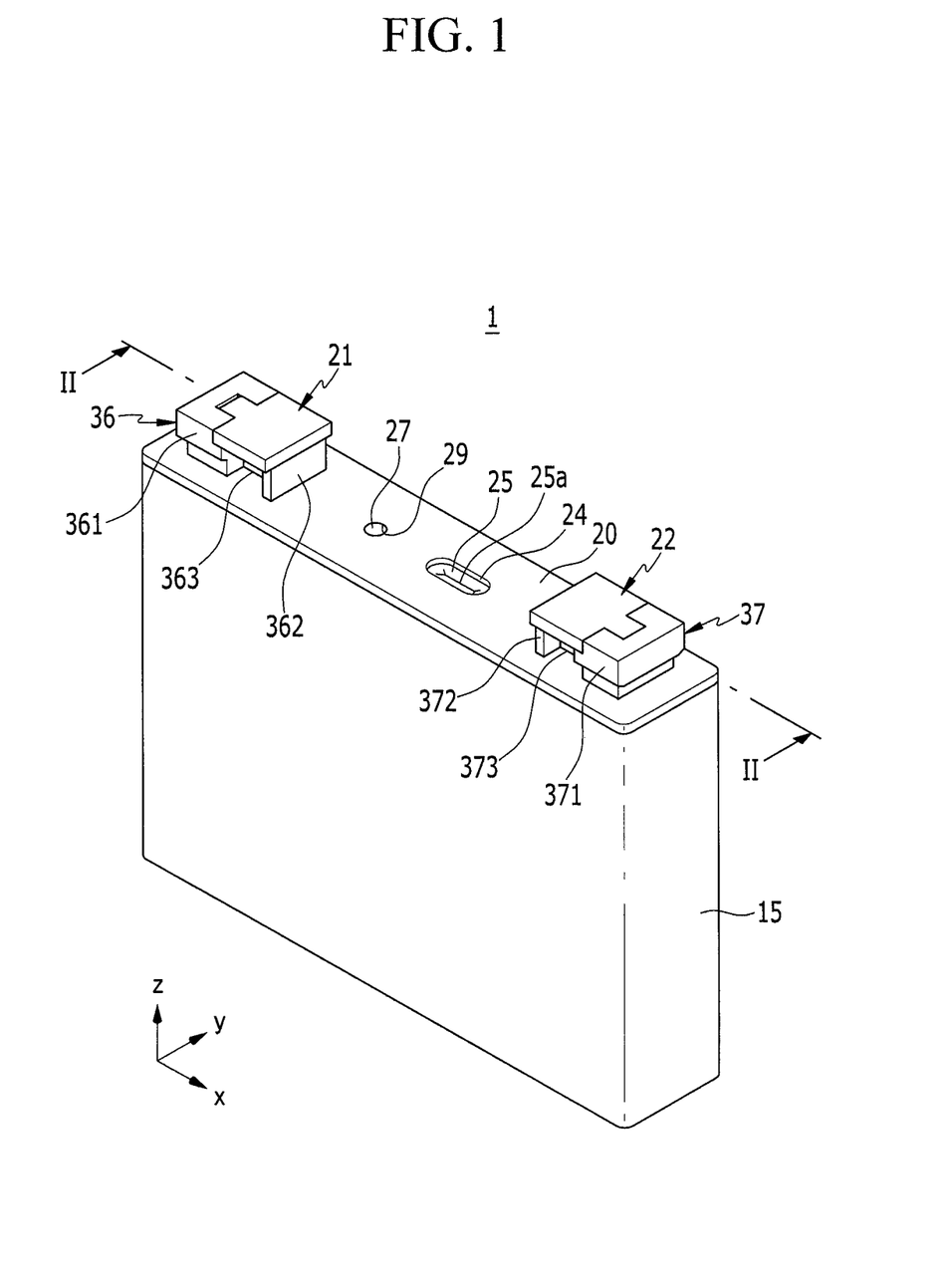
FIG. 1 is a perspective view illustrating a rechargeable battery according to a first exemplary embodiment of the present invention.
Figure 2:
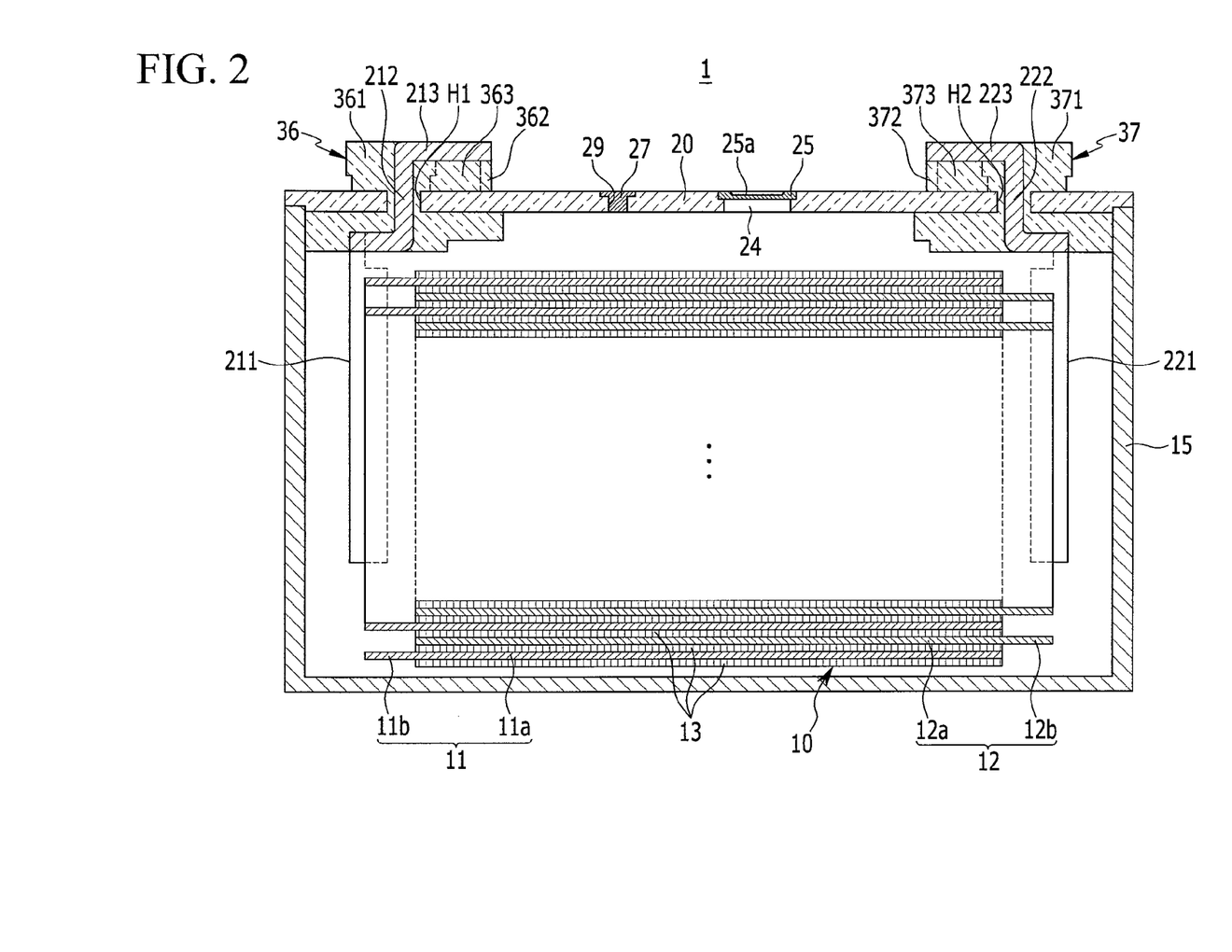
FIG. 2 is a cross-sectional view illustrating the rechargeable battery taken along line II-II of FIG. 1.

FIG. 1 is a perspective view illustrating a rechargeable battery according to a first exemplary embodiment of the present invention, and FIG. 2 is a cross-sectional view illustrating the rechargeable battery taken along line II-II of FIG. 1.

Referring to FIGS. 1 and 2, a rechargeable battery 1 according to the first exemplary embodiment includes an electrode assembly 10 that charges and discharges a current, a case 15 that houses the electrode assembly 10, a cap plate 20 that closes and seals an opening of the case 15, electrode terminals (hereinafter, for convenience, referred to as "negative and positive electrode terminals 21 and 22) that are electrically connected to the electrode assembly 10 and located outside of the cap plate 20, and insulating members 36 and 37 that electrically insulate the cap plate 20 and the negative and positive electrode terminals 21 and 22, respectively.

For example, the electrode assembly 10 is formed by placing a negative electrode 11 and a positive electrode 12 on respective surfaces of a separator 13, which is an insulator, and by spirally-winding the negative electrode 11, the separator 13, and the positive electrode 12 in a jelly roll state.

The negative electrode 11 and the positive electrode 12 respectively include coated regions 11a and 12a in which an active material is applied to a current collector made of a metal foil, and uncoated regions 11b and 12b, respectively, that are formed with an exposed current collector because an active material is not applied thereto.

The uncoated region 11b of the negative electrode 11 is formed in an end portion of one side of the negative electrode 11 along the spiral-wound negative electrode 11. The uncoated region 12b of the positive electrode 12 is formed in an end portion of one side of the positive electrode 12 along the spiral-wound positive electrode 12. The uncoated regions 11b and 12b are located at opposite end portions of the electrode assembly 10.

For example, the case 15 may be formed as an approximate cuboid to provide a space that houses the electrode assembly 10 and an electrolyte solution therein, and may form an opening that connects the outside and an internal space thereof at one surface of the cuboid. The opening enables the electrode assembly 10 to be inserted into the case 15.

The cap plate 20 is installed in an opening of the case 15 to close and seal the case 15. For example, the case 15 and the cap plate 20 may be made of the same material, such as aluminum, and are welded to each other.

Further, the cap plate 20 has an electrolyte injection opening 29, a vent hole 24, and terminal holes H1 and H2. The electrolyte injection opening 29 enables injection of an electrolyte solution into the case 15. After the electrolyte solution is injected, the electrolyte injection opening 29 is sealed by a seal stopper 27.

In order to discharge an internal gas and an internal pressure of the rechargeable battery 1, the vent hole 24 is closed and sealed with a welded vent plate 25. When an internal pressure of the rechargeable battery 1 reaches a predetermined pressure, the vent plate 25 is fractured to open the vent hole 24. The vent plate 25 has a notch 25*a* that induces fracture.

The negative and positive electrode terminals 21 and 22 are connected to the electrode assembly 10 at one side with the respective insulating members 36 and 37, penetrate the terminal holes H1 and H2 of the cap plate 20, and are located at the outside of the cap plate 20 at the other side.

The insulating members 36 and 37 electrically insulate the negative and positive electrode terminals 21 and 22 from the cap plate 20 while partially supporting the negative and positive electrode terminals 21 and 22, respectively, at an outer surface of the cap plate 20.

For example, the insulating members 36 and 37 may be insert injection molded to be integrally formed and connected between the negative and positive electrode terminals 21 and 22 and an outer surface of the cap plate 20, between the negative and positive electrode terminals 21 and 22 and the terminal holes H1 and H2, and between the negative and positive electrode terminals 21 and 22 and an inner surface of the cap plate 20.

Further, the negative and positive electrode terminals 21 and 22 include integrally formed current collecting portions 211 and 221, pillar portions 212 and 222, and plane portions 213 and 223 while being insulated from the cap plate 20 to correspond to the insulating members 36 and 37, respectively.

For example, because the negative electrode terminal 21 is connected to the negative electrode 11, the negative electrode terminal 21 may be made of copper forming a current collector of the negative electrode 11, and because the positive electrode terminal 22 is connected to the positive electrode 12, the positive electrode terminal 22 may be made of aluminum forming a current collector of the positive electrode 12.

The current collecting portions 211 and 221 are welded to the uncoated regions 11*b* and 12*b* of the negative electrode 11 and the positive electrode 12, respectively, of the electrode assembly 10 within the case 15 to be electrically connected. The pillar portions 212 and 222 are connected to bend to the current collecting portions 211 and 221 and are located at the terminal holes H1 and H2 with the insulating members 36 and 37, respectively, between the pillar portions and the cap plate. The plane portions 213 and 223 are connected to bend to the pillar portions 212 and 222 and are extended and oriented in a direction receding from the terminal holes H1 and H2 by interposing the insulating members 36 and 37, respectively, at the outside of the case 15.

Figure 3:
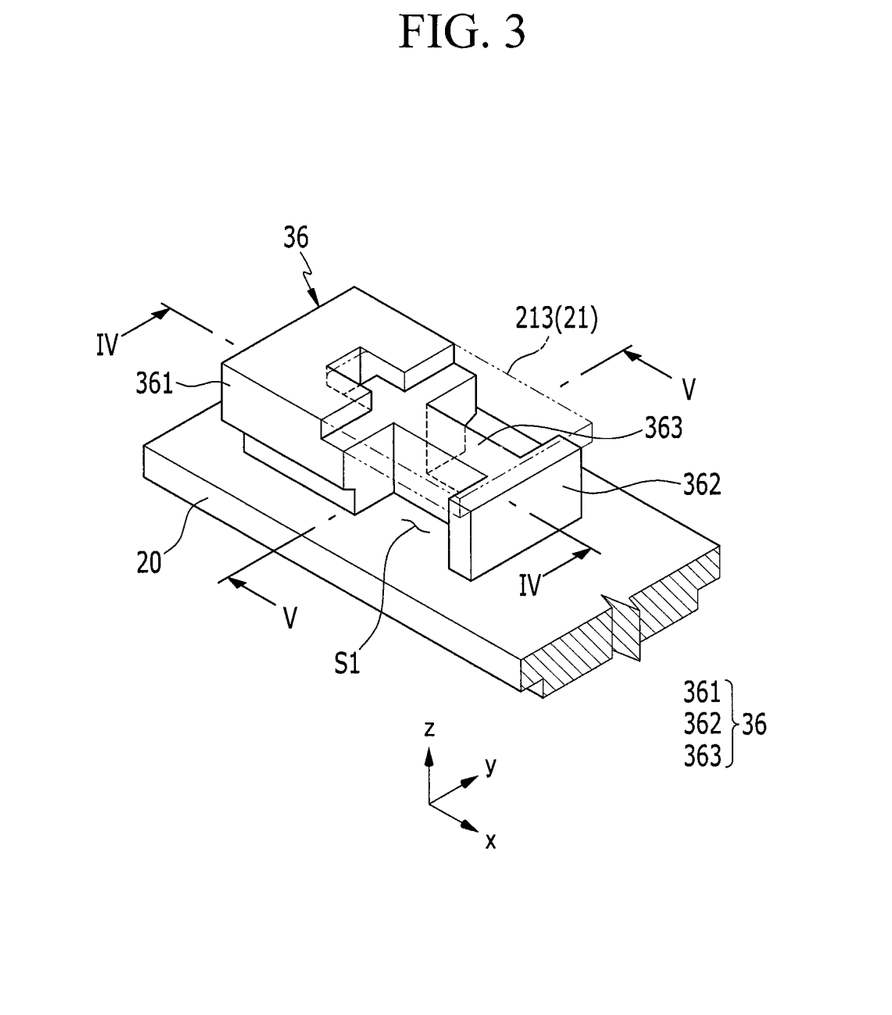
FIG. 3 is a perspective view illustrating an insulating member that is formed at an outer surface of a cap plate in the rechargeable battery of FIG. 1.

FIG. 3 is a perspective view illustrating an insulating member that is formed at an outer surface of a cap plate in the rechargeable battery of FIG. 1. For convenience, the negative electrode terminal 21 and the insulating member 36 will be described with reference to FIG. 3.

The plane portion 213 is separated from (i.e., spaced from) an outer surface of the cap plate 20 at both sides of a width direction (y-axis direction) of the cap plate 20 to face an outer surface of the cap plate 20. In other words, the plane portion 213 is insulated from the insulating member 36 in a portion thereof and is separated in another portion to be insulated from the atmosphere.

Figure 4:
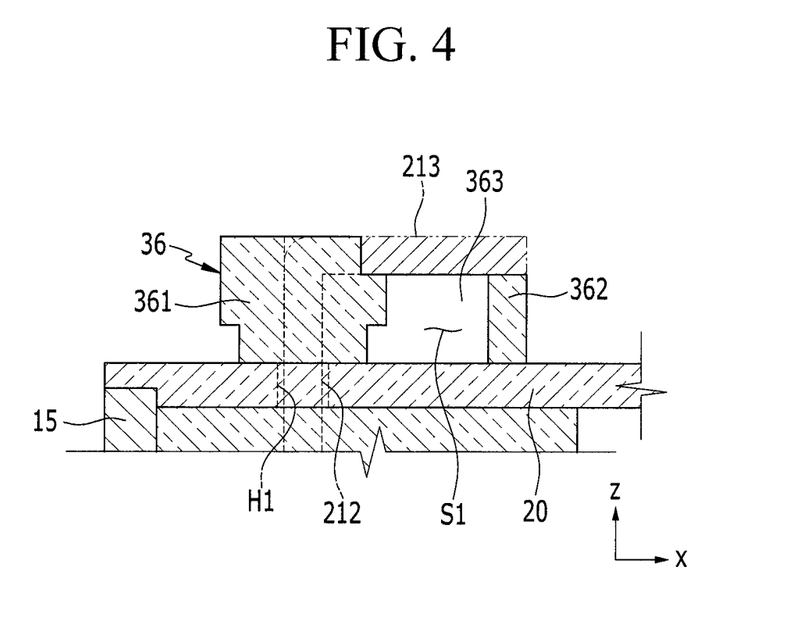
FIG. 4 is a cross-sectional view illustrating the insulating member taken along line IV-IV of FIG. 3.

FIG. 4 is a cross-sectional view illustrating the insulating member taken along line IV-IV of FIG. 3. Referring to FIGS. 3 and 4, the insulating member 36 includes a first insulating portion 361, a second insulating portion 362, and a heat avoidance space S1 according to a corresponding location of the cap plate 20 and the negative electrode terminal 21.

The first insulating portion 361 encloses the pillar portion 212 at a periphery of the terminal hole H1 and supports one side of the plane portion 213. The second insulating portion 362 is located at a separated location in a length direction (x-axis direction) of the cap plate 20 in the first insulating portion 361 to support the other side of the plane portion 213.

The heat avoidance space S1 may prevent welding heat occurring when welding a busbar 71 (see FIG. 8) to the plane portion 213 at both sides of a width direction (y-axis direction) of the cap plate 20 from affecting the battery structure. The heat avoidance space S1 is set between outer surfaces of the separated plane portion 213 and cap plate 20 and between the first and second insulating portions 361 and 362.

Figure 5:
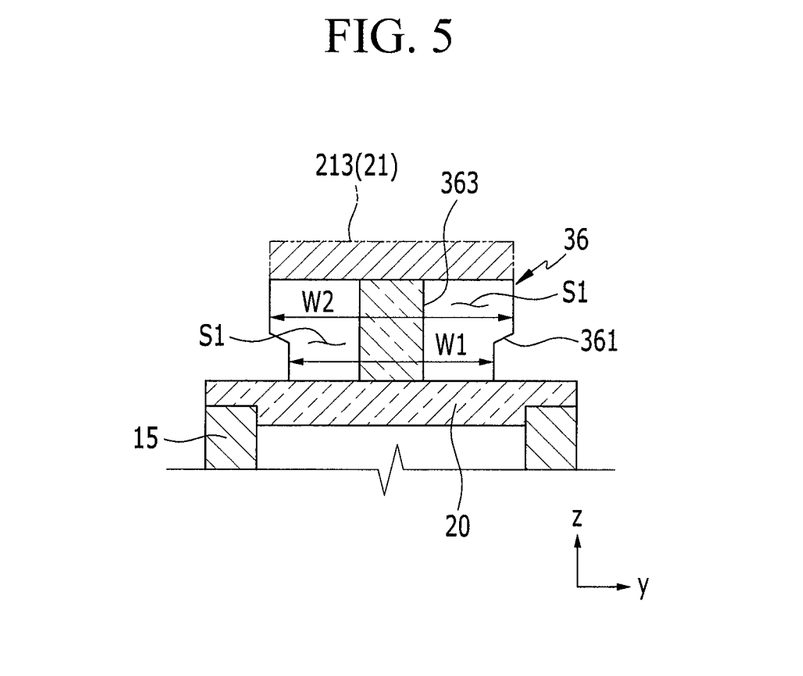
FIG. 5 is a cross-sectional view illustrating the insulating member taken along line V-V of FIG. 3.

FIG. 5 is a cross-sectional view illustrating the insulating member taken along line V-V of FIG. 3. The insulating member 36 further includes a third insulating portion 363. The third insulating portion 363 is oriented in a length direction (x-axis direction) of the cap plate 20 to connect the first insulating portion 361 and the second insulating portion 362, and supports the plane portion 213.

Therefore, the third insulating portion 363 supports an outer surface of the cap plate 20 and the separated plane portion 213 between the first and second insulating portions 361 and 362 to reinforce support strength of the negative electrode terminal 21 that is weakened due to the heat avoidance space S1.

Due to the third insulating portion 363, the heat avoidance space S1 is set at both sides of a width direction (y-axis direction) of the third insulating portion 363. Therefore, when welding the busbar 71 (see FIG. 8) to the plane portion 213, welding heat occurring at either side can be avoided at both side heat avoidance spaces S1 of the third insulating portion 363. In other words, even when welding heat is generated, the insulating member 36 can be prevented from melting and thus the insulating member 36 can stably support the negative electrode terminal 21 and the plane portion 213.

Further, the first insulating portion 361 has a portion that is set with a first width W1 and a portion that is set with a second width W2 in a width direction (y-axis direction) of the cap plate 20. In other words, the first insulating portion 361 is formed with the first width W1 at the adjacent side of the cap plate 20 and is formed with the second width W2 that is larger than the first width W1 at the adjacent side of the plane portion 213.

At the adjacent side of the cap plate 20, the first insulating portion 361 absorbs welding heat that is radiated from an outer surface of the cap plate 20 in the plane portion 213 by a portion that is set with the narrower first width W1 and thus an influence of welding heat may be reduced.

The second insulating portion 362 is formed with the same width size as the first width W1 of the first insulating portion 361 in a width direction (y-axis direction) of the cap plate 20. Because the second insulating portion 362 absorbs welding heat, an influence of the welding heat may be reduced.

Further, the plane portion 213 is formed with the second width W2 in a width direction (y-axis direction) to be supported in the second width W2 in the first insulating portion 361 and to be supported with the first width W1 in the second insulating portion 362. Therefore, the plane portion 213 may not be supported at an outer edge of the second insulating portion 362. In other words, the second insulating portion 362 may further avoid welding heat of the plane portion 213.

Hereinafter, a second exemplary embodiment of the present invention will be described. In the following description, constituent elements identical to or corresponding to those of the first exemplary embodiment will be omitted, and only dissimilar constituent elements will be described.

Figure 6:
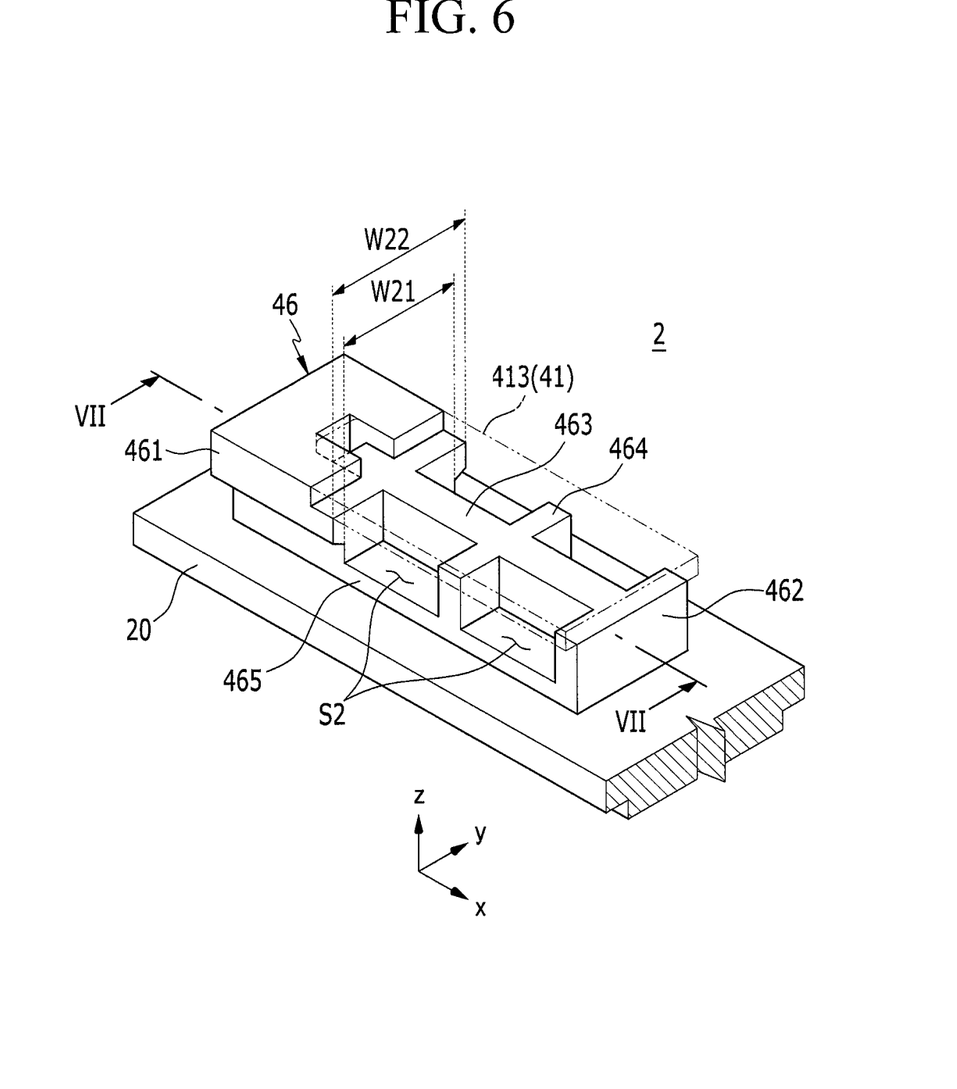
FIG. 6 is a partial perspective view illustrating a portion of a rechargeable battery according to a second exemplary embodiment of the present invention.
Figure 7:
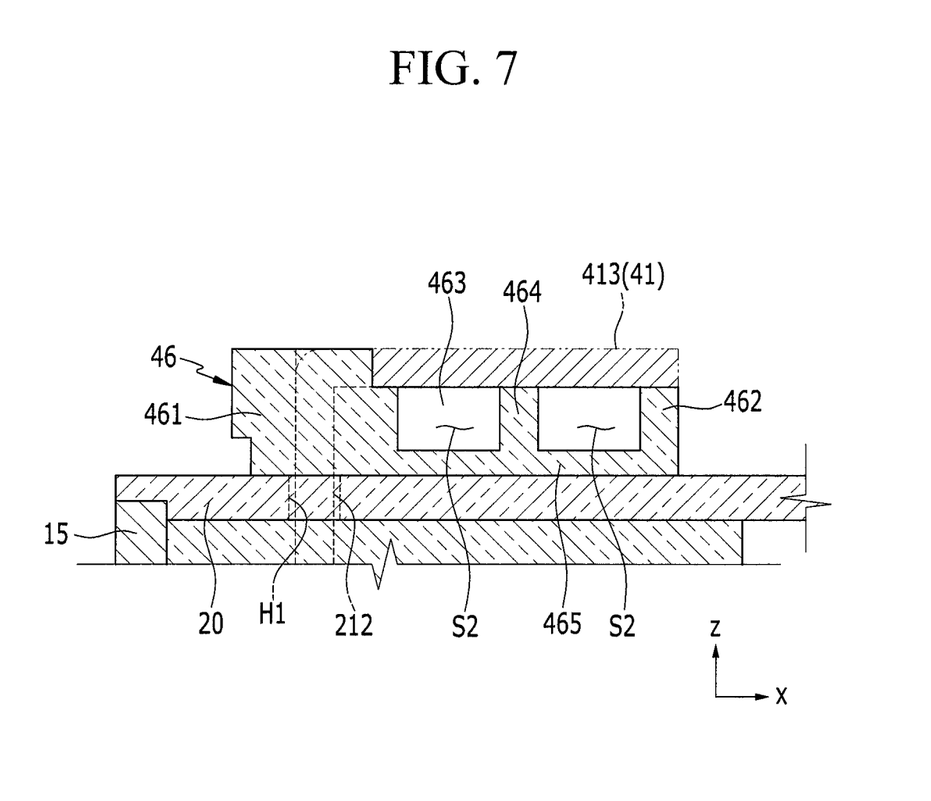
FIG. 7 is a cross-sectional view illustrating the rechargeable battery taken along line VII-VII of FIG. 6.

FIG. 6 is a partial perspective view illustrating a portion of a rechargeable battery according to a second exemplary embodiment of the present invention, and FIG. 7 is a cross-sectional view illustrating the rechargeable battery taken along line VII-VII of FIG. 6.

Referring to FIGS. 6 and 7, in a rechargeable battery 2 according to the second exemplary embodiment, a plane portion 413 faces and is separated from a bottom portion 465 of an insulating member 46 at both sides of a width direction (y-axis direction) of a cap plate 20. In other words, the plane portion 413 is insulated by the insulating member 46 in a portion and is separated from the bottom portion 465 in another portion to be insulated from the atmosphere.

For example, the insulating member 46 may include a first insulating portion 461, a second insulating portion 462, the bottom portion 465, and a heat avoidance space S2 according to a corresponding location of the cap plate 20 and a negative electrode terminal 41.

The first insulating portion 461 encloses a pillar portion 212 at a periphery of a terminal hole H1 and supports one side of the plane portion 413. The second insulating portion 462 is located at a separated location in a length direction (x-axis direction) of the cap plate 20 in the first insulating portion 461 to support another side of the plane portion 413. The bottom portion 465 connects the first insulating portion 461 and the second insulating portion 462 at an outer surface of the cap plate 20.

The heat avoidance space S2 may avoid welding heat occurring when welding the busbar 71 (see FIG. 8) to the plane portion 413 at both sides of a width direction (y-axis direction) of the cap plate 20. The heat avoidance space S2 is set between the separated plane portion 413 and the bottom portion 465 and between the first and second insulating portions 461 and 462.

The insulating member 46 further includes a third insulating portion 463. The third insulating portion 463 is oriented in a length direction (x-axis direction) of the cap plate 20 on the bottom portion 465 to connect the first insulating portion 461 and the second insulating portion 462, and further supports the plane portion 413.

The insulating member 46 further includes a fourth insulating portion 464. The fourth insulating portion 464 is oriented in a width direction (y-axis direction) between the first insulating portion 461 and the second insulating portion 462 on the bottom portion 465 to further support the plane portion 413.

Therefore, the third and fourth insulating portions 463 and 464 support the bottom portion 465 and the separated plane portion 413 between the first and second insulating portions 461 and 462, thereby reinforcing support strength of the negative electrode terminal 41 that is weakened due to the heat avoidance space S2.

The heat avoidance space S2 is set at both sides of a width direction (y-axis direction) of the third insulating portion 463 due to the third insulating portion 463, and is set at both sides of a length direction (x-axis direction) of the fourth insulating portion 464 due to the fourth insulating portion 464.

Therefore, when welding the busbar 71 (see FIG. 8) to the plane portion 413, welding heat occurring at both sides may be avoided at the heat avoidance space S2 of both sides of the third and fourth insulating portions 463 and 464. In other words, even when welding heat is generated, because the insulating member 46 may be prevented from melting, the insulating member 46 can stably support the negative electrode terminal 41 and the plane portion 413.

Further, the first insulating portion 461 has a portion having a first width W21 and a portion having a second width W22 in a width direction (y-axis direction) of the cap plate 20. In other words, the first insulating portion 461 is formed with a first width W21 at the adjacent side of the cap plate 20 and is formed with a second width W22 that is larger than the first width W21 at the adjacent side of the plane portion 413.

At the adjacent side of the cap plate 20, by a portion in which the first insulating portion 461 is set to the narrower first width W21, because the first insulating portion 461 avoids welding heat that is radiated from an outer surface of the cap plate 20 in the plane portion 413, an influence of welding heat can be reduced.

The second and fourth insulating portions 462 and 464 and the bottom portion 465 are formed with the same width size as that of the first width W21 of the first insulating portion 461 in a width direction (y-axis direction) of the cap plate 20. Because the second and fourth insulating portions 462 and 464 and the bottom portion 465 avoid welding heat, an influence of the welding heat can be reduced.

Further, the plane portion 413 is formed with a second width W22 in a width direction (y-axis direction) to be supported in the second width W22 in the first insulating portion 461, and is supported in the first width W21 in the second and fourth insulating portions 462 and 464. Therefore, the plane portion 413 has no support at an outer edge of the second and fourth insulating portions 462 and 464. In other words, the second and fourth insulating portions 462 and 464 and the bottom portion 465 can further avoid welding heat of the plane portion 413.

Figure 8:
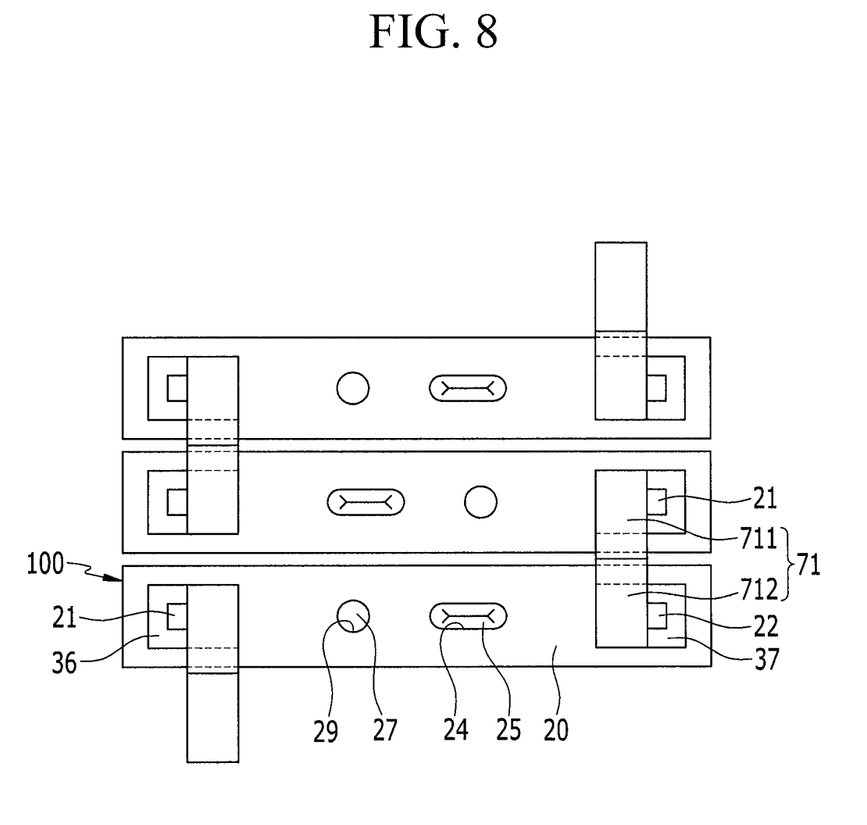
FIG. 8 is a top plan view illustrating a rechargeable battery module to which the rechargeable battery of FIG. 1 is applied.

FIG. 8 is a top plan view illustrating a rechargeable battery module to which the rechargeable battery of FIG. 1 is applied. Referring to FIG. 8, a rechargeable battery module of an exemplary embodiment includes unit battery cells 100 that are formed with rechargeable batteries and a busbar 71 that couples the adjacent unit battery cells 100 in series.

In one embodiment, the busbar 71 is made of a clad metal having a negative electrode portion 711 and a positive electrode portion 712 made of the same material as that of a negative electrode terminal 21 and a positive electrode terminal 22. For example, the negative electrode portion 711 may be made of copper, and the positive electrode portion 712 may be made of aluminum. Therefore, the busbar 71 is connected to the negative and positive electrode terminals 21 and 22 of the adjacent unit battery cells 100 by laser welding with the negative and positive electrode portions 711 and 712.

As shown in the rechargeable battery 1 of the first exemplary embodiment, in the unit battery cell 100, the heat avoidance space S1 of the insulating member 36 may allow the insulating member 36 to avoid welding heat occurring when welding the busbar 71 to the negative and positive electrode terminals 21 and 22 at both sides of a width direction of the cap plate 20.

In other words, because the insulating member 36 is isolated from an influence of welding heat occurring upon laser welding, the insulating member 36 is not melted or does not generate smoke. Therefore, strength deterioration and an external appearance failure of the insulating member 36 can be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| | |
|---|---|
| 1, 2: rechargeable battery | 10: electrode assembly |
| 11, 12: negative electrode and positive electrode | |
| 11a, 12a: coated region | |
| 11b, 12b: uncoated region | 13: separator |
| 15: case | 20: cap plate |
| 21, 41: negative electrode terminal | |
| 22: positive electrode terminal | |
| 24: vent hole | 25: vent plate |
| 25a: notch | 27: seal stopper |
| 29: electrolyte injection opening | |
| 36, 37, 46: insulating member | |
| 71: busbar | 100: unit battery cell |
| 211, 221: current collecting portion | |
| 212, 222, 212: pillar portion | |
| 213, 223, 413: plane portion | 361, 461: first insulating portion |
| 362, 462: second insulating portion | 363, 463: third insulating portion |
| 465: bottom portion | 464: fourth insulating portion |
| 711: negative electrode portion | |
| 712: positive electrode portion | |
| H1, H2: terminal hole | S1, S2: heat avoidance space |
| W1, W21: first width | W2, W22: second width |

What is claimed is:

1. A rechargeable battery comprising:
an electrode assembly;
a case housing the electrode assembly;
a cap plate sealing an opening of the case;
an electrode terminal that is electrically connected to the electrode assembly and extends through a terminal hole of the cap plate and is oriented on an exterior of the cap plate, wherein the electrode terminal comprises:
a current collecting portion that is connected to the electrode assembly;
a pillar portion that is connected to the current collecting portion and is located at the terminal hole; and
a plane portion that is connected to the pillar portion and extends in a direction away from the terminal hole; and
an insulating member that electrically insulates the cap plate and the electrode terminal from each other while supporting the electrode terminal at an exterior surface of the cap plate, wherein the insulating member defines a heat avoidance space that is configured to dissipate welding heat at both sides of a width direction of the cap plate, wherein the insulating member comprises:
a first insulating portion that encloses the pillar portion at the terminal hole and that supports one side of the plane portion, wherein the first insulating portion has a first width at the cap plate and has a second width that is larger than the first width at a portion spaced from the cap plate;
a second insulating portion that is spaced from the first insulating portion along the cap plate to support another side of the plane portion;
a third insulating portion that is oriented in the width direction between the first insulating portion and the second insulating portion on the bottom portion to support the plane portion; and
a bottom portion that connects the first insulating portion and the second insulating portion at an exterior surface of the cap plate, wherein the plane portion faces and is spaced from the bottom portion of the insulating member at both sides of a width direction of the cap plate,
wherein the second insulating portion and the third insulating portion have a width substantially equal to the first width.

2. The rechargeable battery of claim 1, wherein the insulating member is insert injection molded to be integrally provided between the electrode terminal and an exterior surface of the cap plate, between the electrode terminal and the terminal hole, and between the electrode terminal and an interior surface of the cap plate.

3. The rechargeable battery of claim 1, wherein the plane portion faces and is spaced from an outer surface of the cap plate at either side of a width direction of the cap plate.

4. The rechargeable battery of claim 1, wherein the heat avoidance space that is configured to dissipate welding heat occurring when welding a busbar to the plane portion is located at either side of a width direction of the cap plate.

5. The rechargeable battery of claim 1, wherein the heat avoidance space is located at both sides of the width direction of the third insulating portion.

6. The rechargeable battery of claim 1, wherein the second insulating portion has a width that is substantially equal to the first width.

7. The rechargeable battery of claim 6, wherein a width of the plane portion is equal to the second width and is supported by the first insulating portion and wherein the planar portion is supported by the second insulating portion such that a lateral edge of the second insulating portion is spaced from a lateral edge of the planar portion.

8. The rechargeable battery of claim 1, wherein the insulating member further comprises a fourth insulating portion that is oriented in a length direction of the cap plate on the bottom portion connecting the first insulating portion and the second insulating portion and supporting the plane portion.

9. The rechargeable battery of claim 1, wherein the heat avoidance space is located at both sides of the width direction of the fourth insulating portion and partitioned by the third insulating portion in the length direction.

10. The rechargeable battery of claim 1, wherein a width of the plane portion is equal to the second width and is supported by the first insulating portion and wherein the planar portion is supported by the second insulating portion and the third insulating portion such that a lateral edge of the second insulating portion is spaced from a lateral edge of the planar portion.

11. A rechargeable battery module comprising:
a plurality of unit battery cells each comprising a negative electrode terminal and a positive electrode terminal made of different metals and being supported and insulated by an insulating member at an exterior surface of a cap plate, wherein one of the negative or positive electrode terminals comprises:
- a current collecting portion that is connected to the electrode assembly;
- a pillar portion that is connected to the current collecting portion and is located at the terminal hole; and
- a plane portion that is connected to the pillar portion and extends in a direction away from the terminal hole; and wherein the insulating member defines a heat avoidance space that is configured to dissipate welding heat at both sides of a width direction of the cap plate, and wherein the insulating member comprises:
- a first insulating portion that encloses the pillar portion at the terminal hole and that supports one side of the plane portion, wherein the first insulating portion has a first width at the cap plate and has a second width that is larger than the first width at a portion spaced from the cap plate;
- a second insulating portion that is spaced from the first insulating portion along the cap plate to support another side of the plane portion;
- a third insulating portion that is oriented in the width direction between the first insulating portion and the second insulating portion on the bottom portion to support the plane portion; and
- a bottom portion that connects the first insulating portion and the second insulating portion at an exterior surface of the cap plate, wherein the plane portion faces and is spaced from the bottom portion of the insulating member at both sides of a width direction of the cap plate, wherein the second insulating portion and the third insulating portion have a width substantially equal to the first width; and
- a busbar comprising a clad metal having a negative electrode portion and a positive electrode portion comprising the same material as the negative electrode terminal and the positive electrode terminal, respectively, and connected to the negative electrode terminal and the positive electrode terminal, respectively, of adjacent unit battery cells.

12. The rechargeable battery module of claim 11, wherein the negative electrode terminal and the negative electrode portion comprise copper and are connected together, and the positive electrode terminal and the positive electrode portion comprise aluminum and are connected together.

* * * * *